Figure 1:
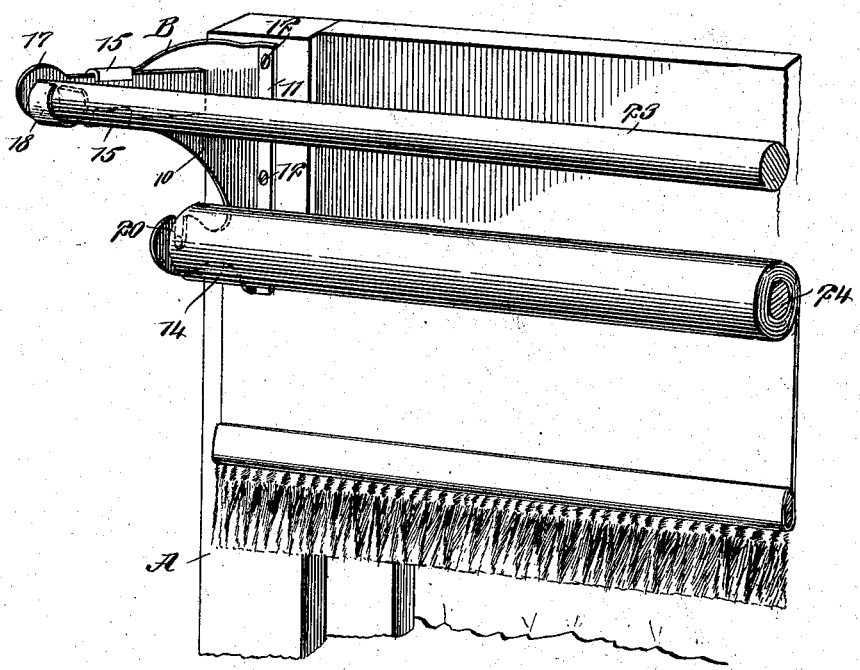

No. 704,351. Patented July 8, 1902.
G. L. LYONS.
CURTAIN POLE AND SHADE ROLLER BRACKET.
(Application filed Aug. 15, 1901.)
(No Model.)

WITNESSES:
Geo. W. Naylor
Fred Acken

INVENTOR
George L. Lyons
BY
ATTORNEYS

UNITED STATES PATENT OFFICE.

BENJAMIN F. ELSON, OF BROOKLYN, NEW YORK.

POLISHING-WHEEL AND METHOD OF MANUFACTURING SAME.

SPECIFICATION forming part of Letters Patent No. 704,789, dated July 15, 1902.

Application filed November 4, 1901. Serial No. 80,990. (No model.)

*To all whom it may concern:*

Be it known that I, BENJAMIN F. ELSON, a citizen of the United States, residing at the borough of Brooklyn, county of Kings, city and State of New York, have invented a new and useful Improvement in Polishing-Wheels and the Method of Manufacturing the Same, of which the following is a specification.

My invention relates to polishing-wheels built up of layers or disks of fabric, the peripheral surfaces of which are adapted to receive emery or rouge powder or similar substances employed for polishing or surfacing metals and other materials. Heretofore the disks or layers composing these wheels have been held together by glue or rubber cement or by rubber in plastic or sheet form, but difficulties have been experienced with all of these ways of connecting the disks. The disks held by glue were liable to separate in use, and the glue coming to the peripheries of the disks produced alternate hard edges between the soft fabric, and these wheels would wear uneven, were liable to scratch, and lacked the desired elasticity. Where rubber was used in plastic or sheet form to connect the disks, it was necessary in order to insure any degree of success to use a high grade of rubber and also new fresh fabric; otherwise the parts would not hold when vulcanized, and the method of making such polishing-wheels required the surfacing of the fabric with rubber between calendering-rollers. This was a long and expensive operation, and consequently produced an expensive article. Where rubber cement has been employed, the bond or union between the layers of fabric has also been unsatisfactory, and a high quality of material had also to be employed, and the disks so made possessed the disadvantage that in a short period of time the rubber would harden and oxidize, the wheel would lose its elasticity, and the parts even separate, and the hardened oxidized rubber would present a more or less granular surface that interfered with the proper operation of the polishing-wheel.

My invention relates to a new article of manufacture and the method of making the same.

In carrying out my invention the polishing-wheels are formed of disks of cotton duck, sheetings, or other suitable fabric and alternate layers of sheet or tissue gutta-percha. These alternate layers are built up to form the polishing-wheel, and they are subjected to heat and pressure, the heat softening the gutta-percha and the pressure causing the same to adhere to the opposing faces of the disks of fabric. I have discovered that for this purpose gutta-percha is not affected by atmospheric conditions or ordinary changes of temperature. It is not affected by time nor by other materials which may be added thereto in small quantity to effect the adhesive qualities of the gutta-percha. I have also discovered that gutta-percha attaches itself under heat and pressure to old fabric practically as well as to new fabric. Therefore remnants can be utilized in the manufacture of these polishing-wheels, and the gutta-percha employed may be of a low grade, and consequently very inexpensive, and the gutta-percha does not oxidize or harden, and the quantity employed is so minute that it does not affect the life or elasticity of the polishing-wheel, it being substantially impossible to discern the connecting medium between the disks of fabric at the periphery of the wheels. These wheels can be quickly made. Therefore economy is effected both in the time and in the material, and the manipulation is exceedingly simple, and there is no grit or hard substances in the wheel to in any wise affect the functions where rouge or other polishing-powder is employed. Where emery or similar powder is employed, these wheels possess the desired elasticity.

Figure 2:
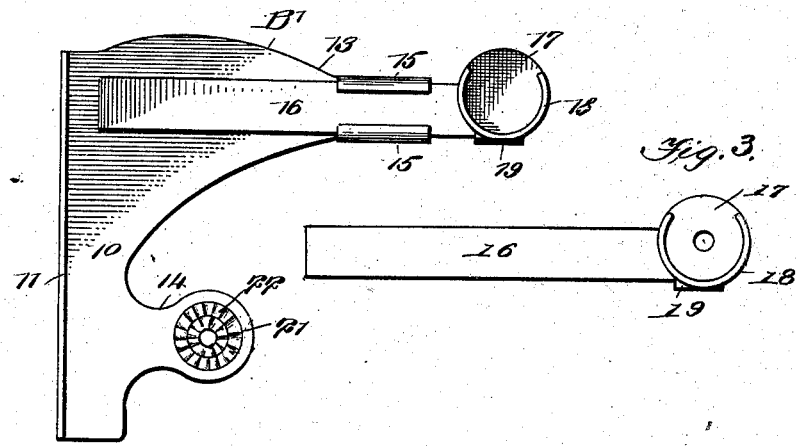

In the drawings, Figure 1 is an elevation representing a polishing-wheel, and Fig. 2 is a vertical section of the same.

*a* represents the successive layers of fabric—such as cotton duck, sheetings, or other suitable material—and *b* represents the alternate or interposed gutta-percha. In building up these wheels the disks of fabric, as well as the gutta-percha sheets or tissue, may be first cut out of the desired size with an opening in the center for the shaft upon which the wheel is to be mounted, or square or other-shaped pieces of fabric may be employed which are afterward cut to circular shape, and in the method employed alternate pieces of fabric and gutta-percha tissue are built up to tical slot 20, (shown in Fig. 1,) adapted to receive one trunnion of a shade-roller 24, of any desired type, while the corresponding arm 14 of the opposing bracket member is provided with a circular opening 21, adapted to receive the opposite trunnion of the said shade-roller, and in this respect the lower arms 14 somewhat resemble the brackets usually employed for supporting shade-rollers. Preferably, however, at the inner face of the lower arm 14, having the circular opening or aperture therein, a ratchet or serrated surface 22 is formed around the opening, as is shown in Fig. 2. This serrated, corrugated, or ratchet surface 22 serves to strengthen the arm 14 and may be produced at the inner face of the corresponding arm having the slot 20 made therein.

It will be observed that each bracket member of the device is made in two parts and that one part is adjustable upon the other, and each bracket member in its entirety serves the dual purpose of supporting a shade-roller and a curtain-pole above the roller.

Having thus described my invention, I claim as new and desire to secure by Letters Patent—

In a curtain-pole and shade-roller bracket, a bracket member having means for attachment to a window or a door frame or a like support, the body of the bracket member being provided with an outwardly-extending arm and slideways formed at the top and bottom portions of said arm at its inner face, and a shorter arm also outwardly extending and located at a point below the vertical center of the bracket, the lower and shorter arm having means for receiving a trunnion of a shade-roller, a slide in the shape of a bar or plate which has guided movement in the said slideways, terminating in a disk formation at its outer end, and a segmental receiver for a curtain-pole, having its open portion facing in an upward direction, which receiver is connected with the bottom portion of the outer disk formation of the said movable plate or bar, extending inwardly at a right angle from the outer terminal of the said adjustable plate or bar, as and for the purpose described.

In testimony whereof I have signed my name to this specification in the presence of two subscribing witnesses.

GEORGE L. LYONS.

Witnesses:
FRANK O. GARDINE,
F. J. COLLINS.